United States Patent

Demarty et al.

(10) Patent No.: US 9,400,842 B2
(45) Date of Patent: Jul. 26, 2016

(54) METHOD FOR SELECTION OF A DOCUMENT SHOT USING GRAPHIC PATHS AND RECEIVER IMPLEMENTING THE METHOD

(75) Inventors: Claire-Hélène Demarty, Montreuil le Gast (FR); Gwenaelle Marquant, La Chapelle Chaussee (FR); Ingrid Autier, Domloup (FR)

(73) Assignee: Thomson Licensing (FR)

( * ) Notice: Subject to any disclaimer, the term of this patent is extended or adjusted under 35 U.S.C. 154(b) by 426 days.

(21) Appl. No.: 13/519,202

(22) PCT Filed: Dec. 13, 2010

(86) PCT No.: PCT/EP2010/069497
§ 371 (c)(1),
(2), (4) Date: Jun. 26, 2012

(87) PCT Pub. No.: WO2011/080052
PCT Pub. Date: Jul. 7, 2011

(65) Prior Publication Data
US 2012/0297338 A1 Nov. 22, 2012

(30) Foreign Application Priority Data

Dec. 28, 2009 (FR) .................................... 09 59616

(51) Int. Cl.
*G06F 3/048* (2013.01)
*H04N 5/00* (2011.01)
(Continued)

(52) U.S. Cl.
CPC .... *G06F 17/30781* (2013.01); *G06F 17/30017* (2013.01)

(58) Field of Classification Search
CPC .............. G06F 3/048; G06F 3/00; H04N 5/00

USPC .......................................................... 715/810
See application file for complete search history.

(56) References Cited

U.S. PATENT DOCUMENTS 5,821,945 A 10/1998 Yeo et al.
6,144,375 A 11/2000 Jain et al.
(Continued)

FOREIGN PATENT DOCUMENTS

EP 0938054 8/1999
EP 0955599 11/1999
(Continued)

OTHER PUBLICATIONS

Canseco-Rodriguez et al., "Speaker Diarization from Speech Transcripts" Spoken Language Processing Group, LIMSI-CNRS, Oct. 4-8, 2004.
(Continued)

*Primary Examiner* — Jennifer To
*Assistant Examiner* — Hugo Molina
(74) *Attorney, Agent, or Firm* — Jack Schwartz & Associates, PLLC (57) ABSTRACT

A method for selection of shots represented by identifiers displayed in a navigation menu. A document is divided into shots. Several attributes such as the moment of appearance of the shot in the document are assigned to each shot. The navigation menu disposes the identifiers according to a first axis according to the moment of appearance of the associated shot and according to a second axis according to the value of a second attribute according to a criterion other than the moment of appearance. A third attribute is determined for each shot according to a criterion other than the two first criteria, the shot identifiers having the same value as this third attribute are connected graphically. In this way the user perceives the value of several attributes associated with each shot and can easily select the shot that interests him. A display device able to display the navigation menu.

19 Claims, 3 Drawing Sheets (51) Int. Cl.
*G06F 3/00* (2006.01)
*G06F 17/30* (2006.01)

(56) References Cited

U.S. PATENT DOCUMENTS

| | | | |
|---|---|---|---|
| 6,721,454 B1 | 4/2004 | Qian et al. | |
| 6,897,866 B1 | 5/2005 | Hetzler et al. | |
| 7,589,750 B1* | 9/2009 | Stratton | 345/677 |
| 7,852,414 B2 | 12/2010 | Kijak et al. | |
| 2004/0263529 A1* | 12/2004 | Okada et al. | 345/619 |
| 2008/0172616 A1* | 7/2008 | Harrington | G06F 17/2229 715/727 |
| 2009/0226046 A1* | 9/2009 | Shteyn | 382/118 |
| 2010/0021125 A1* | 1/2010 | Ingrosso et al. | 386/52 |

FOREIGN PATENT DOCUMENTS

| | | |
|---|---|---|
| EP | 1040429 | 10/2000 |
| EP | 1081604 | 3/2001 |
| EP | 1081960 | 3/2001 |
| EP | 1132832 | 9/2001 |
| EP | 1286278 | 2/2003 |
| EP | 1770490 | 4/2007 |
| FR | 02.13977 | 10/2002 |
| FR | 02.13978 | 10/2002 |
| FR | 07/54076 | 3/2007 |
| FR | 02890516 | 3/2007 |
| WO | WO02/07164 | 1/2002 |
| WO | WO-2004040471 | 5/2004 |
| WO | WO2008035022 | 3/2008 |
| WO | WO-2008125436 | 10/2008 |

OTHER PUBLICATIONS http://www.biometrie-online.net/technologies/visage.

Elie El Khoury et al. "Association of Audio and Video Segmentations for Automatic Person Indexing" Universite Paul Sabatier, pp. 287-294, 1-4244-1011-8/07, 2007, IEEE.

Elie El Khoury et al. "Speaker Diarization-Towards a More Robust and Portable System" SAMoVA Team-IRIT-CNRS UMR 5505, pp. 489-492 1-4244-0728-1/07, 2007, IEEE.

* cited by examiner

METHOD FOR SELECTION OF A
DOCUMENT SHOT USING GRAPHIC PATHS
AND RECEIVER IMPLEMENTING THE
METHOD

This application claims the benefit, under 35 U.S.C. §365 of International Application PCT/EP2010/069497, filed Dec. 13, 2010, which was published in accordance with PCT Article 21(2) on Jul. 7, 2011 in English and which claims the benefit of French patent application No. 0959616, filed Dec. 28, 2009.

FIELD OF THE INVENTION

The invention relates to a method for navigation among documents displayed on a display screen and a receiver equipped with a user interface using the method.

BACKGROUND OF THE INVENTION

These days, numerous users have an audio or audiovisual document reproduction device in their homes. These documents are generally stored in digital form, either in the device itself, for example in the hard disk, or in the local network of the residence, or again in a database that can be accessed via a public network such as Internet. The documents are associated with descriptive data enabling them to be characterized. These descriptive data generally called "attributes" are extracted from a list of classification elements. The descriptive data are for example defined according to the MPEG7 standard. In this way, the user can introduce one or more attributes and launch a search for documents that possess these attributes. In the case of a video document, it is divided into shots by the producer, attribute values are also associated with each shot. It is thus possible to generate document summaries by selecting shots having given characteristics, for example the same actor.

Currently, reproduction devices have a storage memory with a large capacity in order to memorize documents of different natures: videos, audio, still pictures, and these in high numbers. To access these documents, the user has an interface ensuring the displaying and the navigation in the set of recorded documents. The document identifiers appear on a screen, the user can select them in order to launch their reproduction. The identifiers appear in lists incorporated in menus. The identifiers can be the title, or an image, or any other element that can be displayed that is representative of the document. The visual identifiers can be video extracts, a photo of the performer of an audio document, a part of a photo, a specific graphic, the jacket of a film, etc. The identifier can also be a particular graphic associated with the document by the producer, or manually associated by the user himself.

Navigation within a large number of documents requires an advanced and efficient interface. For example, the application FR07/54076 published 3 Oct. 2008 and deposed by the applicant, defines a menu where document identifiers are placed that are connected together by graphic paths. A reproduction device equipped with such a device is for example a PVR (Personal Video Recorder). A PVR is a device equipped with a hard disk, a display means, and a means for command introduction. Commands can be introduced using a remote control, or using a cursor selecting icons, or by voice recognition. The user interface enables access to audio, photo or even mixed libraries, with different items of equipment being able to be closer to a personal computer. This interface applies in the case of documents that are distinct and that are not linked by a chronology.

The document US 2004/0263529—OKADA published 30 Dec. 2004 describes a document analysis menu. The thumbnails of sequences of the document are presented horizontally according to time. The user introduces a keyword and the system will find the sequences having a relation with this keyword. The degree of similarity of each sequence with this keyword is evaluated and the sequence thumbnails are positioned vertically according to this similarity. The user can then change the degree of similarity by vertically displacing the thumbnails if he considers that the degree calculated is erroneous. In this way, the user can select certain sequences more or less close to a criterion and place them into a summary.

The document WO 2008/035022 describes the realization of several documents taken by several sources (cameras) during a same event. The documents are divided into sequences and are presented chronologically. Thumbnails enable the category of documents to be changed and thus the list of identifiers to be changed. When the menu presenting chronologically the identifiers is displayed, the user can select the sequences of each source and thus compose a document from several sources.

SUMMARY OF THE INVENTION

The present invention presents a new way of navigating in the shots of a document, enabling the user to find more easily the shot that he is searching for.

The purpose of the invention is a method for selection of a shot of a document identified by an identifier displayed in a navigation menu, comprising a step of division of a document into a plurality of shots, and a step of determination of at least three attribute values associated with each shot of the document according to three different criteria, the first attribute being according to the moment of the appearance of this shot within the document and the second attribute defined by a second criterion different to that of the moment of appearance, and a third attribute being different from the two first attributes, characterized in that the method comprises:

a step of placement in the navigation menu of a plurality of identifiers each identifying a shot of the document, the set of plans identified in the menu composing a continuous part of the document, the position in the menu of each identifier being a function according to a first axis of the value of the first attribute and according to a second axis not parallel to the first of the value of the second attribute, a single identifier being displayed in the menu for a given instant, a step of displaying of at least one graphic path connecting the identifiers identifying the shots associated with the same attribute value according to this third criterion, a step of navigation within the document consisting in highlighting identifiers appearing on the at least one graphic path and a step of reproduction of the shot associated with a highlighted identifier.

In this way, the user takes account more easily of the existence of similarities between the shots extracted from a same document while conserving on the screen the chronology of shots. The graphic path enables him to navigate between the shots that have a characteristic in common. In this way, he can easily look for a shot that corresponds to his search, select it and launch its reproduction.

According to a first improvement, when an identifier is selected, the method comprises a step consisting in displaying with the same graphic distinction the set of paths connected to this identifier. In this way, the user is informed of other shots having similarities with the shot associated with the selected identifier. According to an improvement, the same graphic distinction is also applied to the identifiers connected by the set of paths connected to this identifier. In this way, the user is even better informed of other shots having similarities with the shot associated with the selected identifier.

According to another improvement, the step of determination of a third criterion comprises a step of introduction of a command for selection among a plurality of criteria for said third criterion. In this way, the user himself chooses the criterion that he wants to be highlighted by the graphic paths.

According to another improvement, the step of reproduction consists in reproducing in order of appearance within the document the shots associated with the identifier connected by paths to the selected identifier. In this way, by selecting a given attribute using any identifier connected to the path associated with this attribute, the user is sure to see the shot that he is searching for. According to an improvement, the reproduction of shots associated with the identifiers connected by paths to the selected identifier commences from the shot associated with the selected identifier. In this way, if the user is sure of not finding the shot before a certain moment of the document, he can launch the reproduction of shots having a certain attribute value, from this moment.

According to another improvement, the step of displaying has graphic distinctions different to those of a path applied to the identifiers having the same attribute value according to a fourth criterion. In this way, the user can be informed of the existence of other attributes than those identified by the graphic paths.

According to another improvement, the step of calculation for each shot of the third attribute calculated from this third criterion uses a value transmitted by the producer of the document and characteristic of each shot. In this way, the data transmitted by the producer of the document can be used by all the reproduction devices. According to a variant, the step of division of the document is implemented by the same device displaying the menu, this device also has at least one calculation module for each shot of the third attribute calculated from the third criterion. In this way, the document does not need to be previously divided into shots, the reproduction device displaying the navigation menu can do it. According to another improvement, the part of the document represented by the identifiers displayed is displaced in the document by the introduction of a command. In this way, the user can displace in time the navigation menu that only displays a temporal window of the document.

The purpose of the present invention is also an electronic device comprising a means of dividing of a document into a plurality of shots, a means of displaying a navigation menu comprising several identifiers associated with shots of said document, a means of introduction of a user action, and a plurality of means of calculation of at least three attribute values associated with each shot of the document according to three different criteria, each of said means calculating a value according to a given criterion, the first attribute being a function of the moment of the appearance of this shot within the document and the second attribute defined by the second criterion different to that of the moment of appearance, and a third attribute different from the two first attributes, characterized in that the display means position in the navigation menu a plurality of identifiers each identifying a shot of the document, the set of shots identified in the menu composing a continuous part of the document, the position in the menu of each identifier being a function according to a first axis of the value of the first attribute and according to a second axis not parallel with the first of the value of the second attribute, the display means also displaying at least one graphic path connecting using a same graphic distinction the identifiers identifying the shot associated with the same attribute value according to a third criterion, the means of introduction enabling navigation within the document while highlighting identifiers appearing on at least one graphic path, and activating the reproduction of the shot associated with the identifier selected by the introduction means.

BRIEF DESCRIPTION OF THE DRAWINGS

Other characteristics and advantages of the invention will now emerge with more details, within the scope of the description that follows, of embodiments given as an example by referring to the figures attached wherein.

DETAILED DESCRIPTION OF PREFERRED EMBODIMENTS

Figure 1:
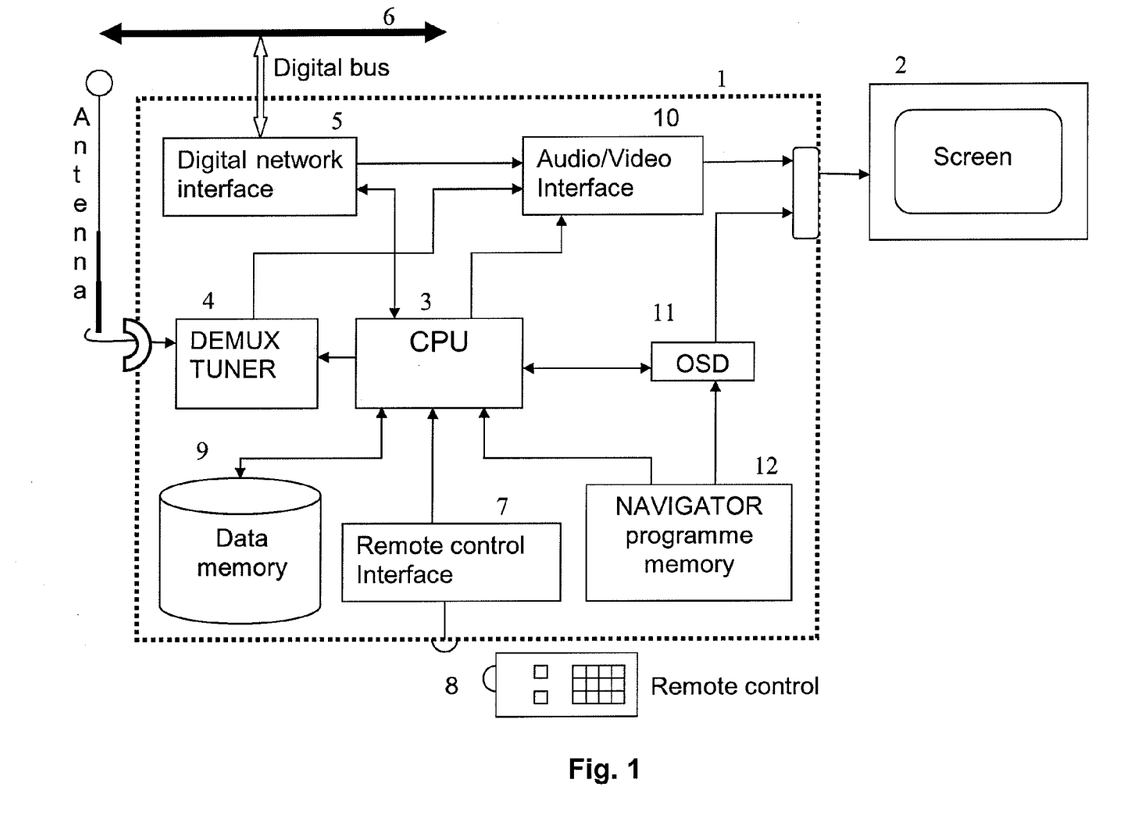
FIG. 1 is a block diagram of a multimedia receiver for the implementation of an embodiment of the invention.

A description will first be made of the structure of a multimedia receiver 1 equipped with a display device 2 according to an embodiment of the invention. A decoder is described here but other devices can also be considered and apply to the present invention, for example a personal computer or a PVR (Personal Video Recorder) or any device able to access audio-visual contents and having the means for creation and display of menus. The receiver comprises a central processing unit 3 connected to a programme memory 12, and an interface 5 for communication with a high bit-rate digital bus 6 enabling audio and/or video data to be received. The most common network enabling access to remote servers is the Internet network. The receiver 1 can also receive audio/video data from a broadcast network via a receiver antenna associated with a demodulator 4. The receiver also comprises a signal receiver 7 to receive signals from a remote control 8, a memory 9 for the storage of audiovisual contents and a database, and an audio/video decoding logic 10 for the generation of audiovisual signals sent to the television screen 2. The receiver has a command introduction means such as a remote control 8 with direction keys, a mouse able to move a cursor displayed by a display device 2. The remote control 8 can be equipped with gyroscopes in such a way to transform movement in space into a signal. By moving the remote control to the left, to the right, up or down, the user moves the cursor on the screen. Such a remote control also comprises a functions key such as "OK" the role of which will be seen later in the description. The memory 9 is advantageously a hard disk of several hundreds of megabytes, enabling several hours at least of the audiovisual content to be recorded. These audiovisual contents are identified by a recorded title and/or one or more thumbnails in the database. It is these thumbnails that will be displayed in the user interface.

The receiver also comprises a display circuit 11 of data on the screen, often called OSD (On Screen Display) circuit. The OSD circuit 11 is a text and graphics generator that enables the on screen display of menus, pictograms (for example, a number corresponding to the channel displayed) and that can display the navigation menus in accordance with the present invention, and notably one or more button bars. The OSD circuit 11 is controlled by the Central Processing Unit 3 and a program called the navigation user interface recorded in the memory 12. The user interface is advantageously realized in the form of a program module recorded in a Read Only Memory (ROM). It can also be realised in the form of an ASIC type specialised circuit for example.

The digital bus 6 and/or the broadcast network transmit, to the receiver, data comprising multimedia content and descriptive data of this content. These data come either from a broadcast network, or from the digital network 6. The descriptive data comprise classification elements generally called "attributes", of multimedia contents that can be accessed. The descriptive data are for example metadata defined according to the MPEG7 standard, for example the title or an image identifying the associated document. These data are stored in the database of the memory 9 of the receiver and are continually updated. The navigation user interface then extracts information from this database and processes it to produce the navigation menus displayed on the screen.

Figure 2:
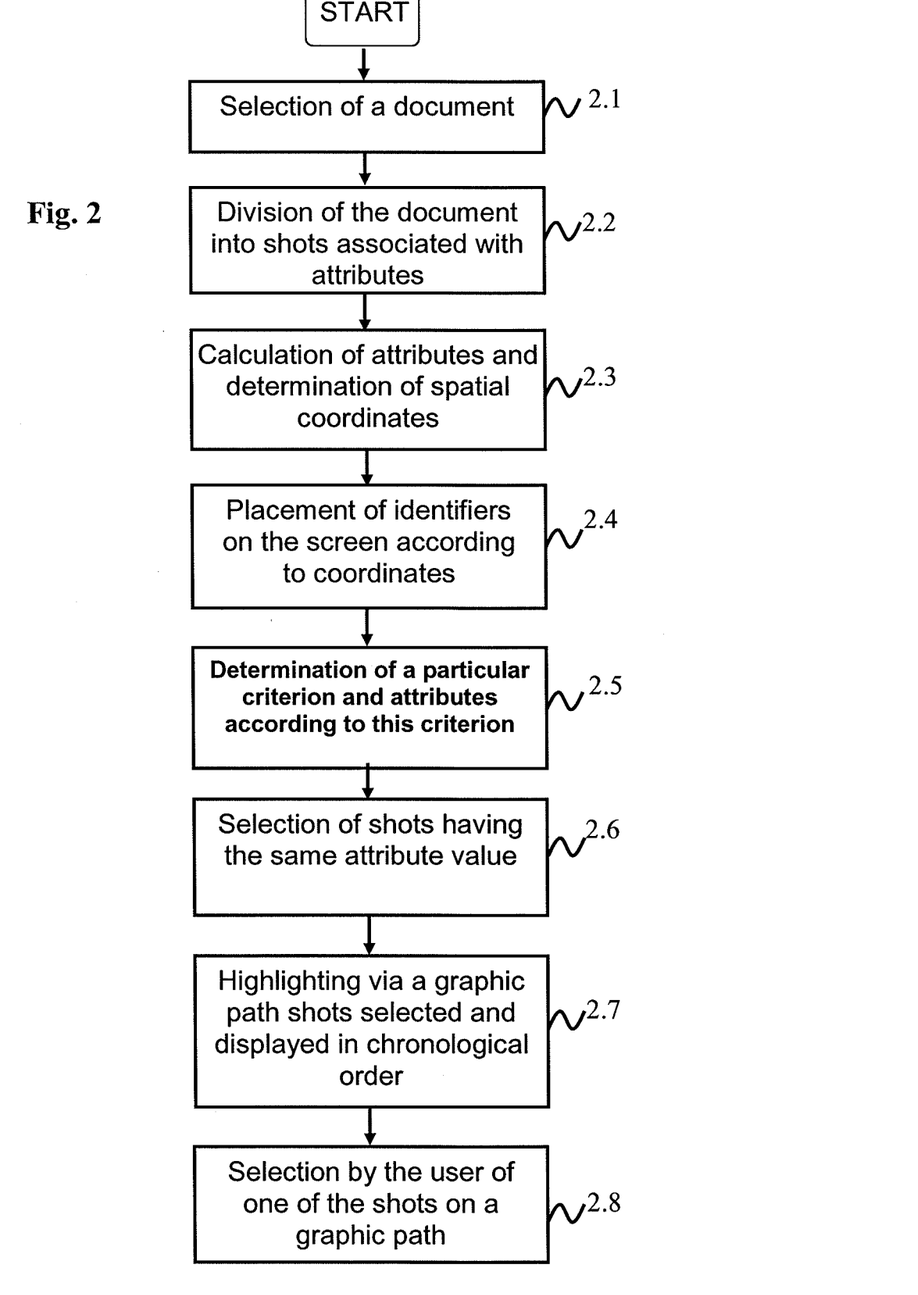
FIG. 2 is a flowchart of the main steps of the selection method according to an embodiment of the invention.

After having described the main components of an embodiment of the invention, it will now be explained how these cooperate to enable the navigation user interface to operate. FIG. 2 shows an overall flowchart of the operations according to an embodiment of the present invention. Initially, the user selects a document using a menu (step 2.1). Then in step 2.2, the user interface divides the document into a plurality of shots. A shot is a set of images having a continuity of action. In the case where the breakdown into a plurality of shots is not provided by the producer of the document, the receiver 1 has analysis means to automatically extract high level information enabling the document to be divided into shots. A first analysis technique is based on the fact that the images of a shot have a visual continuity, and that two consecutive images have a visual content in common. Other analysis techniques exist that consist in finding the structure of a video document knowing the document type considered as well as the model of the associated video structure. This technique is for example used to analyse sporting events. The analysis consists in taking into account the intrinsic fixed structure of the sport being considered and the more random structure linked to the editing used. An estimation method used is described in the French patent applications FR02.13977 and FR02.13978 filed 28 Oct. 2002 by the applicant.

The shots are ordered chronologically, in order of appearance in the document, the moment of the appearance of a shot in the document constitutes the value of a first attribute. In step 2.3, the shots are then analysed in order to extract other attributes linked to their content. Numerous analysis methods are available, based on the visual or audio content of a shot:
  visual recognition such as: particular face, particular objects,
  detection of voice off,
  search for acoustic environment
  environment recognition.

The analysis or "diarization" modules enable attributes to be calculated from the audio content of a shot. The article "Speaker Diarization from Speech Transcipts" published by the "Spoken Language Processing Group—LIMSI-CNRS, BP 133 ORSAY France" describe a method for analysing the sound of a segment and deducing from it the speakers present. A module enabling the implementation of such a method is typically implemented in a user interface of the receiver.

Each diarization module provides an attribute value according to a determined criterion. For example, three modules are active, the analysis criterion of the first is the presence of certain actors, the second detects the location where the shot was filmed, and the third determines the acoustic environment. For example shot 1 is associated with the attributes: 2 actors present: Alice and Bill, scene in a kitchen, romantic ambiance, shot 2 is associated with the attributes: 1 actor present: B, scene in a living room, telephone conversation, shot 3 is associated with the attributes: 1 actor present: Alice, scene in a car, romantic ambiance, etc. Once the set of shots have been analysed, the user interface calculates a spatial coordinate from attribute values. For example, the coordinate can be the number of actors present: 1, 2, 3, etc. Another example consists in attributing values to different locations of a scene: 1: Living room, 2: Kitchen, 3: Bedroom, 4: Bathroom, 5: Town street, 6: Countryside, 7: Public location, or a level of violence.

In step 2.4, the shot identifiers in the in the temporal window displayed by the menu are placed according to a reference formed by two non parallel axes, the first coordinate associated with the first axis is the value of the first attribute, that is to say: the moment when the shot appears in the document, the second coordinate associated with the second axis is the value of a second attribute. According to an improvement, this second coordinate is the result of a calculation involving the intervention of several attribute values associated with the sequence for which the identifier is to be positioned. The shot identifiers are for example thumbnails. The term "thumbnail" designates a small image that is extracted from the associated shot. Other identifiers are available, such as for example a text describing the content of the shot.

The first coordinate of an identifier is the moment of the appearance of the associated shot. At a given instant of the document only one identifier corresponds. In this way, the user perceives the chronology of shots in the document. Advantageously, the menu displays a semi-axis graduated into time units, the start of this semi-axis corresponding to the start of the document. The shot identifiers are placed at the point of their moment of appearance within the document on the time axis. The second coordinate, that is to say the height if the temporal axis is traced horizontally, of each identifier is the value of the second attribute.

Figure 3:
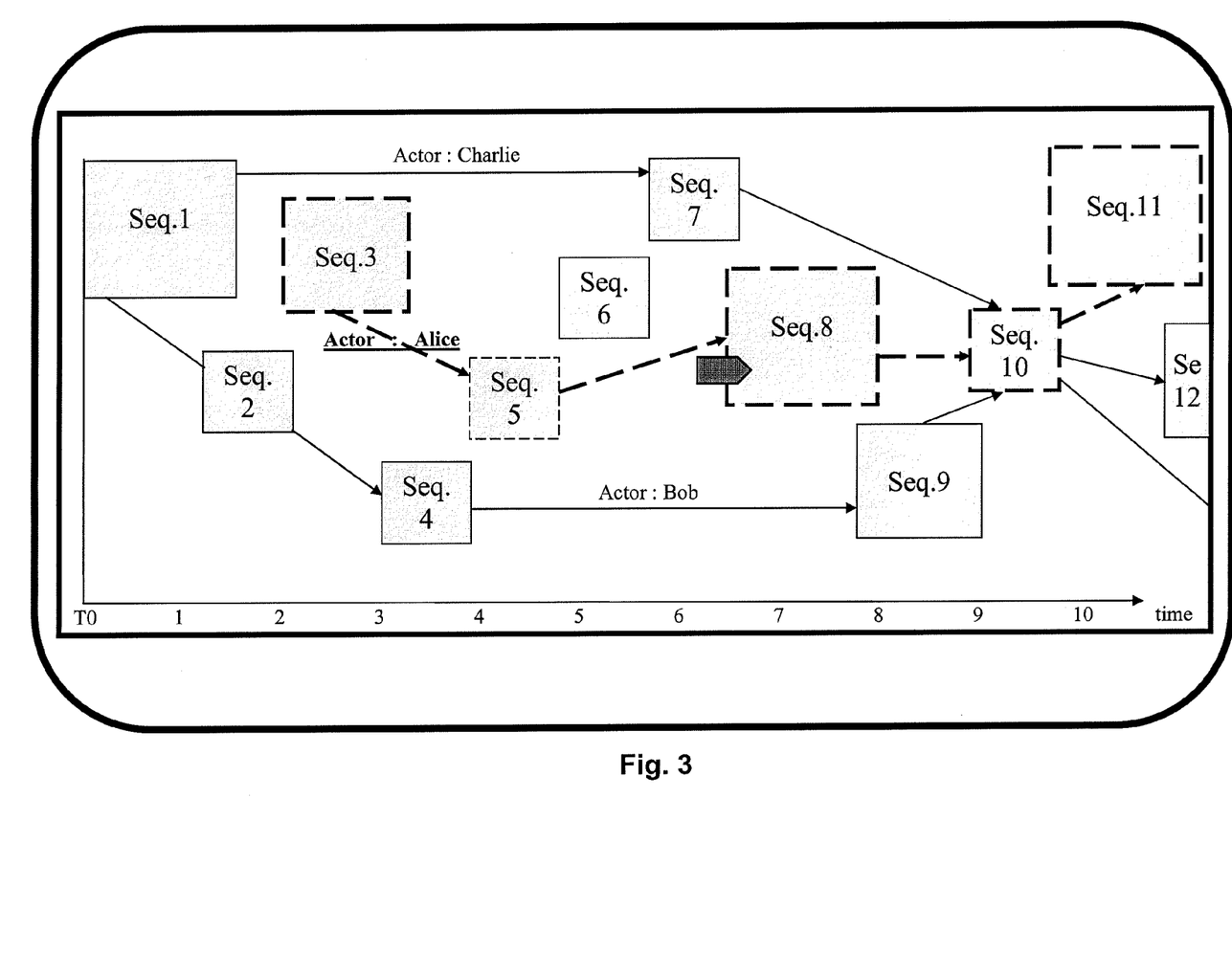
FIG. 3 shows an example of a screen appearance displayed by the user interface for navigation among the documents.

In step 2.5, the user interface determines at least a third analysis criterion other than the time criterion and the criterion that was already used for the placement of the identifier and calculates the attribute values according to this criterion. The user interface then selects the shots that have the same attribute value according to this third criterion (step 2.6). In step 2.7, the user interface highlights all the identifiers displayed of the selected shots. The graphic highlighting is in the form of a graphic path successively connecting and respecting the in chronological order, the identifiers of the selected shots. The path is manifested for example in the form of a plurality of lines connecting two by two identifiers as shown in FIG. 3. Advantageously, several attributes can be graphically highlighted by as many graphic paths connecting the identifiers. Advantageously, each path has a specific graphic characteristic that enables them to be tracked more easily in the menu.

It is preferable that the criterion and the attribute values used to select the sequences placed on a graphic path are different to those used to position the identifiers in the menu displayed. If the criteria and the attribute values are identical, then the paths are horizontal which is of little value visually. However, if the attributes are different, the paths develop vertically and can even overlap which produces an attractive visual effect. FIG. 3 shows a succession of shots, the attribute used to vertically place the identifiers is the location of the scene, each of the three paths indicating the presence of Alice, of Bob and of Charlie, presented in the shots during the document at different heights that are a function of the presence of the actor. Finally, when the user sees on the menu the different identifiers and the paths displayed, he can select an identifier on a graphic path knowing that the associated shot has a specific characteristic (step 2.8). Once selected via the cursor, the user launches the reproduction of this shot by introducing a command.

The user can use commands to displace an exploration temporal window forwards or backwards. According to the displacements, new identifiers appear. According to the position of identifiers and graphic paths displayed, the user easily finds shots that are situated in a determined environment determine with particular actors and at a particular moment of the document. When the user has found a shot that corresponds to his requirements, he selects it and launches its reproduction.

FIG. 3 shows a navigation menu enabling the user to select shots. The menu comprises a temporal semi-axis at the base of the screen that commences at the beginning of the document and is graduated in minutes. According to the duration of the document, only one temporal window is displayed, the user can displace a window within the document using the left or right direction key. In the example of FIG. 3, the menu displays a window of 11 minutes during which the user interface has detected 12 shots. The shots are identified by frames containing an image extracted from the associated shot. In FIG. 3, the graphic paths are represented by lines, in the example the lines connect frames for which the associated shots show a given actor. In the example, the actor "Charlie" is present in the shots 1, 7, 10 and 12, the actor "Bob" is present in the shots 1, 4, 9 and 10, and the actor "Alice" is present in the shots 3, 5, 8, 10 and 11. FIG. 3 presents three paths that are identified by the name of an actor appearing in all the shots of a same path. FIG. 3 is in black and white, but it is easy to imagine that the lines have a colour depending of the path to which they belong, and thus on the value of the attributes that are associated with each shot present on the path. The user can thus easily see that the three actors are present in shot 10.

A cursor moving via a mouse, direction keys, the movements of a remote control or again via voice recognition, is shown in the form of a dark arrow. As shown in FIG. 3, the cursor is placed on the shot 8 that is thus selected. If the user presses the validation key, the reproduction of the shot 8 is executed, and the video of the shot is displayed in full screen. The navigation menu disappears and reappears at the end of the reproduced shot. Advantageously, when a shot identifier is selected, the path or paths passing by this identifier as well as the identifiers crossed by those paths have the same graphic distinction thus defining the selected path. In the example of FIG. 3, line arrows and frames on the path identifying the presence of the actor "Alice" are in dots. Other graphic characteristics can be imagined, notably highlighting, experience shows that flashing highlights this characteristic particularly well. If the user selects a shot that is found on several paths, then all the paths and the identifiers connected to these paths have the same graphic characteristic as the selected shot. For example, if the user selects shot 10 where the three actors "Alice", "Bob" and "Charlie" are present, then the shots 1, 2, 3, 4, 5, 7, 8, 9, 10, 11, 12 and the three paths are highlighted, or will flash.

According to a preferred embodiment, the user interface itself determines the classification criterion for which the attribute value enables the shots that are placed on the path to be selected. According to a variant, the determination of the classification criterion is carried out by a command introduced by the user of the user interface. In a configuration menu, a list of criteria is displayed and the user chooses that which serves for the determination of paths. In the case of FIG. 3, the user has selected the identities of the actors present.

According to an improvement, another command launches the automatic reproduction of all the shots present on a path, from the shot selected and up to the end of the document. By taking again the example of FIG. 3, if the user selects shot 5 that is the path connecting all the shots where the actor "Alice" is present, then the shots 5, 8, 10 and 11 and all the other shots of the document that are not displayed in the temporal window and where the actor "Alice" is present are successively reproduced. According to an improvement, if the user selects a shot that is found on several paths, then all the shots connected to these paths are successively and chronologically reproduced. For example, if the user selects shot 1 where the actors "Bob" and "Charlie" are present, then the shots 1, 2, 4, 7, 9, 10, 12, etc. will be reproduced without interruption.

In addition to the fact that the identifiers are present chronologically and that the graphic paths connect some among them according to their attribute values, it is possible to graphically present other attributes to the user in order to facilitate his search. According to an improvement, in addition to the position, the size of thumbnails in the menu is also determined via the user interface according to the value of a criterion of the associated shot that is neither the time, or the criteria used to define the graphic paths. These third and fourth attributes are determined via the user interface by analysing each shot, or by the document producer, for example a value expressing the importance of the shot for the comprehension of the document. Thus, the position of the identifier in the displayed menu (that is to say its height in the case of FIG. 3) depends on a third attribute associated with the shot. Typically, the shots having a great importance for the comprehension of the document are placed at the top of the displayed menu. The size of the identifier depends on a fourth attribute, such as for example the interest of a shot in respect of a user. The interest of a shot is calculated by correlating the attributes connected to this shot and the attributes of the profile of the user. For example, if the user prefers romantic documents and if the analysis of this shot (softness of speech, presence of close-up, slow music, etc.) evokes a romantic ambiance, then the identifier of this shot appears in a frame of maximum size.

With the introduction of the menu in three dimensions, it is possible to present the navigation menu implementing a fourth criterion. In this case, the depth of the identifier of each sequence appearing in the navigation menu depends on the value of attributes according to this fourth criterion for the sequence being considered. The graphic path or paths displayed take into account the three dimensions, for example, the lines connecting identifiers together advancing or receding in the 3D menu according to the connections.

While the present invention was described in reference to particular illustrated embodiments, said invention is in no way limited to these embodiments, but only by the appended claims. Other changes or modifications to the embodiments previously described can be contributed by those in the profession, without leaving the framework of the present invention.

The invention claimed is:

1. Method implemented in a receiver for navigating within and selection of a shot of a document, the document being divided into a plurality of shots associated with at least three attributes, a first attribute value being determined according to the moment of appearance of the shots within the document, a second and a third attribute value being respectively determined according to the content of the shots of the document, the method comprising, at the receiver:

receiving the document;

dividing the document into the plurality of shots;

displaying in a navigation menu on a screen a plurality of identifiers each identifying a shot of the document, the position in the menu of each identifier being according to a first axis of the first attribute and a second axis of the second attribute, the second axis being not parallel to the first axis;

in response to a preliminary selection of one of the displayed identifiers, displaying on the screen at least one graphic path graphically connecting in a chronological order the identifiers identifying the shots associated with a same third attribute value as the shot identified by the preliminarily selected identifier, where each shot is extracted from the same document;

in response to displaying on the screen the at least one graphic path, highlighting the at least one graphic path graphically connecting in a chronological order the identifiers identifying the shots connected to the selected identifier as well as the identifiers connected by the at least one highlighted graphic path, such that the highlighted graphic paths and identifiers are displayed with a same graphic distinction; and in response to a selection of one of the highlighted identifiers, reproducing the shot associated with the selected highlighted identifier.

2. The method according to claim 1, wherein, in response to the selection of one of the displayed identifiers, reproducing the shot associated with the selected identifier, as well as the shots associated with the identifiers connected to the selected identifier by the at least one graphic path.

3. The method according to claim 2, wherein reproducing the shots is in the order of the moment of appearance of the shots within the document.

4. The method according to claim 1, wherein the selection of one of the displayed identifiers is launched upon receipt of a user input.

5. The method according to claim 1, wherein the graphic path is represented by a line.

6. The method according to claim 1, wherein the second attribute value is determined according to the location where the shot is filmed, and the third attribute value is determined according to the people present in the shot.

7. The method according to claim 1,
wherein each of the displayed identifiers is an image extracted from the associated shot or a text describing the content of the associated shot.

8. The method according to claim 1, wherein each shot is associated with a fourth attribute, the size of each displayed identifier being according to the fourth attribute value of the associated shot.

9. The method according to claim 1, further comprising storing the received document in a memory unit.

10. A system for navigating within and selection of a shot of a document, the document being divided into a plurality of shots associated with at least three attributes, a first attribute value being determined according to the moment of appearance of the shots within the document, a second and a third attribute value being respectively determined according to the content of the shots of the document, the system comprising:

a receiving unit to receive a document, and
one or more computer processor to
divide the document into the plurality of shots;

provide to a display a navigation menu comprising a plurality of identifiers each identifying a shot of the document, the position in the menu of each identifier being according to a first axis of the first attribute and a second axis of the second attribute, the second axis being not parallel to the first axis;

in response to a preliminary selection of one of the displayed identifiers, provide to a display at least one graphic path connecting in a chronological order the identifiers identifying the shots associated with a same third attribute value as the shot identified by the preliminarily selected identifier, where each shot is extracted from the same document;

in response to displaying on the screen the at least one graphic path, highlighting the at least one graphic path graphically connecting in a chronological order the identifiers identifying the shots connected to the selected identifier as well as the identifiers connected by the at least one highlighted graphic path, such that the highlighted graphic paths and identifiers are displayed with a same graphic distinction; and in response to a selection of one of the highlighted identifiers, reproducing the shot associated with the selected highlighted identifier.

11. The system according to claim 10, further comprising an input unit to receive a user input for selecting one of the displayed identifiers.

12. The system according to claim 10, further comprising a memory unit for the storage of the received document.

13. The system according to claim 10, wherein each of the plurality of identifiers provided by the processing unit are extracted from an associated shot of the document or text describing the content of an associated shot.

14. The system according to claim 10, wherein, in response to the selection of one of the displayed identifiers, the processing unit reproduces the shot associated with the selected identifier, as well as the shots associated with the identifiers connected to the selected identifier by the at least one graphic path.

15. The system according to claim 10, wherein the processing unit reproduces the shots is in the order of the moment of appearance of the shots within the document.

16. The system according to claim 10, wherein the at least one graphic path provided by the processing unit is represented by a line.

17. The system according to claim 10, wherein the processing unit determines the second attribute value according to the location where the shot is filmed, and determines the third attribute value according to the people present in the shot.

18. The system according to claim 10, wherein each shot is associated with a fourth attribute, the size of each displayed identifier being according to the fourth attribute value of the associated shot.

19. A non-transitory computer readable storage medium having stored therein instructions for navigating within and selection of a shot of a document, the document being divided into a plurality of shots associated with at least three attributes, a first attribute value being respectively determined according to the content of the shots of the document, a second and a third attribute value being determined according to a second and a third criterion different from the moment of appearance, wherein, when executed by a computer, the instructions cause to computer to:

receive a document;

divide the document into the plurality of shots;

display in a navigation menu on a screen a plurality of identifiers each identifying a shot of the document, the position in the menu of each identifier being according to a first axis of the first attribute and a second axis of the second attribute, the second axis being not parallel to the first axis;

in response to a preliminary selection of one of the displayed identifiers, display on the screen at least one graphic path connecting in a chronological order the identifiers identifying the shots associated with a same third attribute value as the shot identified by the preliminarily selected identifier, where each shot is extracted from the same document;

in response to displaying on the screen the at least one graphic path, highlighting the at least one graphic path graphically connecting in a chronological order the identifiers identifying the shots connected to the selected identifier as well as the identifiers connected by the at least one highlighted graphic path, such that the highlighted graphic paths and identifiers are displayed with a same graphic distinction; and in response to a selection of one of the highlighted identifiers, reproducing the shot associated with the selected highlighted identifier.

* * * * *